United States Patent [19]

Freeman et al.

[11] 4,054,978
[45] Oct. 25, 1977

[54] METHOD FOR REPAIR OF VALVES

[75] Inventors: John W. Freeman; Thomas M. Jones; Harold D. Reagan, all of Houston, Tex.

[73] Assignee: ACF Industries, Incorporated, New York, N.Y.

[21] Appl. No.: 687,262

[22] Filed: May 17, 1976

Related U.S. Application Data

[62] Division of Ser. No. 548,308, Feb. 10, 1975, abandoned.

[51] Int. Cl.² .......................... B23P 7/00; B23P 15/00; F16K 27/10
[52] U.S. Cl. ............................ 29/157.1 R; 29/401 R; 228/119; 251/329; 138/97; 285/21; 285/286; 285/15; 285/331
[58] Field of Search .......... 29/157.1 R, 401 R, 401 A, 29/401 C; 228/119; 138/97; 251/329; 285/22, 21, 286, 15, 331

[56] References Cited

U.S. PATENT DOCUMENTS

| 1,991,343 | 2/1935 | Ball | 285/331 |
| 2,065,628 | 12/1936 | Taylor et al. | 29/157.1 R |
| 2,895,747 | 7/1959 | Bland et al. | 285/21 |
| 3,032,310 | 5/1962 | Hansen | 251/329 |
| 3,866,952 | 2/1975 | Inoue et al. | 285/21 |
| 3,881,756 | 5/1975 | Takatori et al. | 285/22 |

Primary Examiner—C.W. Lanham
Assistant Examiner—Daniel C. Crane
Attorney, Agent, or Firm—Eugene N. Riddle

[57] ABSTRACT

A valve bonnet structure has an inner ring spaced slightly from the inner surface of the bonnet structure and secured along its lower edge portion to the bonnet. An angle-shaped member having a downturned leg lapping the ring is secured to the inner surface of the bonnet structure above the ring. For repair of the valve, an upper valve bonnet portion having the angle-shaped member thereon is removed by a cutting tool with the ring remaining in place on the lower valve bonnet portion. After repair of the valve, the upper and lower valve bonnet portions are welded together adjacent the ring with the downturned leg thereon fitting over the ring, and a seal between the leg and ring prevents fluid within the valve structure from being exposed to the welding operation.

3 Claims, 5 Drawing Figures

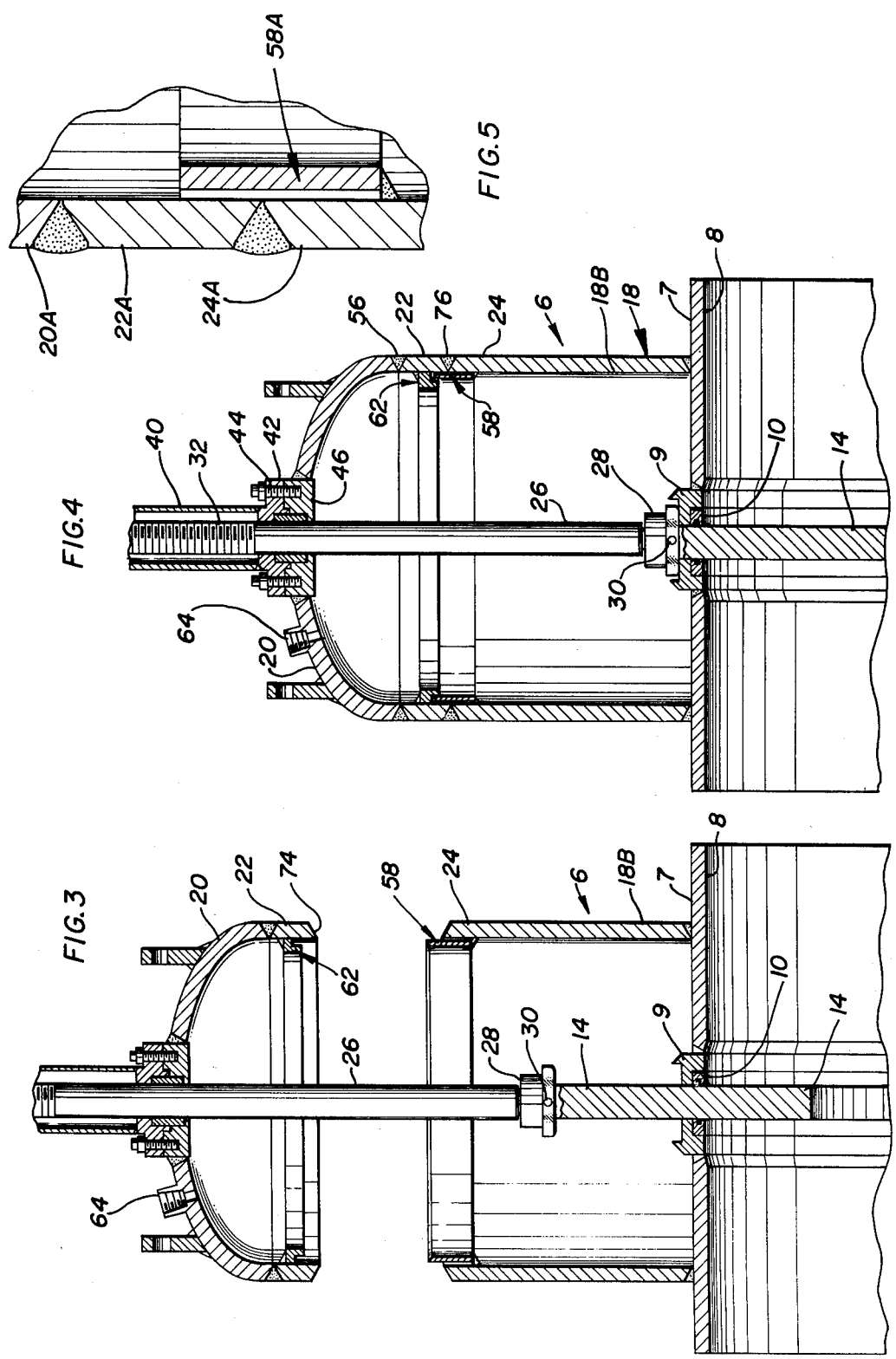

METHOD FOR REPAIR OF VALVES

This is a division, of application Ser. No. 548,308, filed Feb. 10, 1975, now abandoned.

BACKGROUND OF THE INVENTION

Valve bonnets may be bolted onto the valve body structure if desired and in such event the bonnets may be easily removed for entry into the valve body structure as may be necessary for repair or replacement of the seats and seals.

However, when valve bonnets have been welded and it has been necessary to repair the valve, it has been normal practice heretofore to remove the valve structure from the line and replace it with another valve. While it is possible with a welded valve bonnet to remove the valve bonnet with a cutting tool and to repair the valve in place within the line, then reweld the valve bonnet, this has not been practiced to any extent because of disadvantages such as particles or foreign matter from the cutting operation for removing the bonnet being deposited within the valve body. Also, when the bonnet is rewelded, the welding torch could be exposed to escaping fluid from the line which might be highly inflammable or explosive. Thus, it has not been practical heretofore to repair gate valves, for example, in place within a line.

BRIEF DESCRIPTION OF THE INVENTION

At times, it is necessary or desirable to replace the valve member or the seats in a valve structure and for this purpose, the bonnet has to be removed in order to obtain access to the valve member or seats, for example. With welded type bonnets as contrasted with bolted bonnets, it is necessary to remove or cut the bonnet by a suitable cutting apparatus, such as employed for pipe and the like. After the valve structure has been repaired, it is necessary to reweld the upper portion of the bonnet which has been removed by cutting and for this purpose, the present invention includes an inner ring or sleeve spaced slightly from the inner surface of the bonnet and secured along its lower edge portion to the bonnet. An angle-shaped member having a downturned leg lapping the ring is secured to the inner surface of the bonnet above the ring either before or after repair of the valve.

For repair of the valve, the upper valve bonnet portion is removed by a suitable cutting tool adjacent the ring with the ring remaining in place on the lower valve bonnet portion while the angle-shaped member is removed with the upper portion of the bonnet. After repair of the valve, the upper and lower valve bonnet portions are welded together adjacent the ring with the downturned leg thereon fitting over the ring and an annular seal positioned between the leg and ring to prevent any fluid in the valve structure from being exposed to the welding operation. Thus, the present invention provides a structure which permits a repair of a valve structure having a welded bonnet by shielding from the interior of the valve body the cutting operation for removal of the bonnet and the subsequent welding operation thereby minimizing any potential hazards in the welding operation.

In the accompanying drawings in which two of various possible embodiments of the invention are illustrated, FIG. 1 is a sectional view of a gate valve structure embodying the present invention;

FIG. 3 is a sectional view of the upper body structure showing the upper portion of the bonnet after it has been removed from the lower portion thereof for repair of the valve structure;

Figures 1, 2:
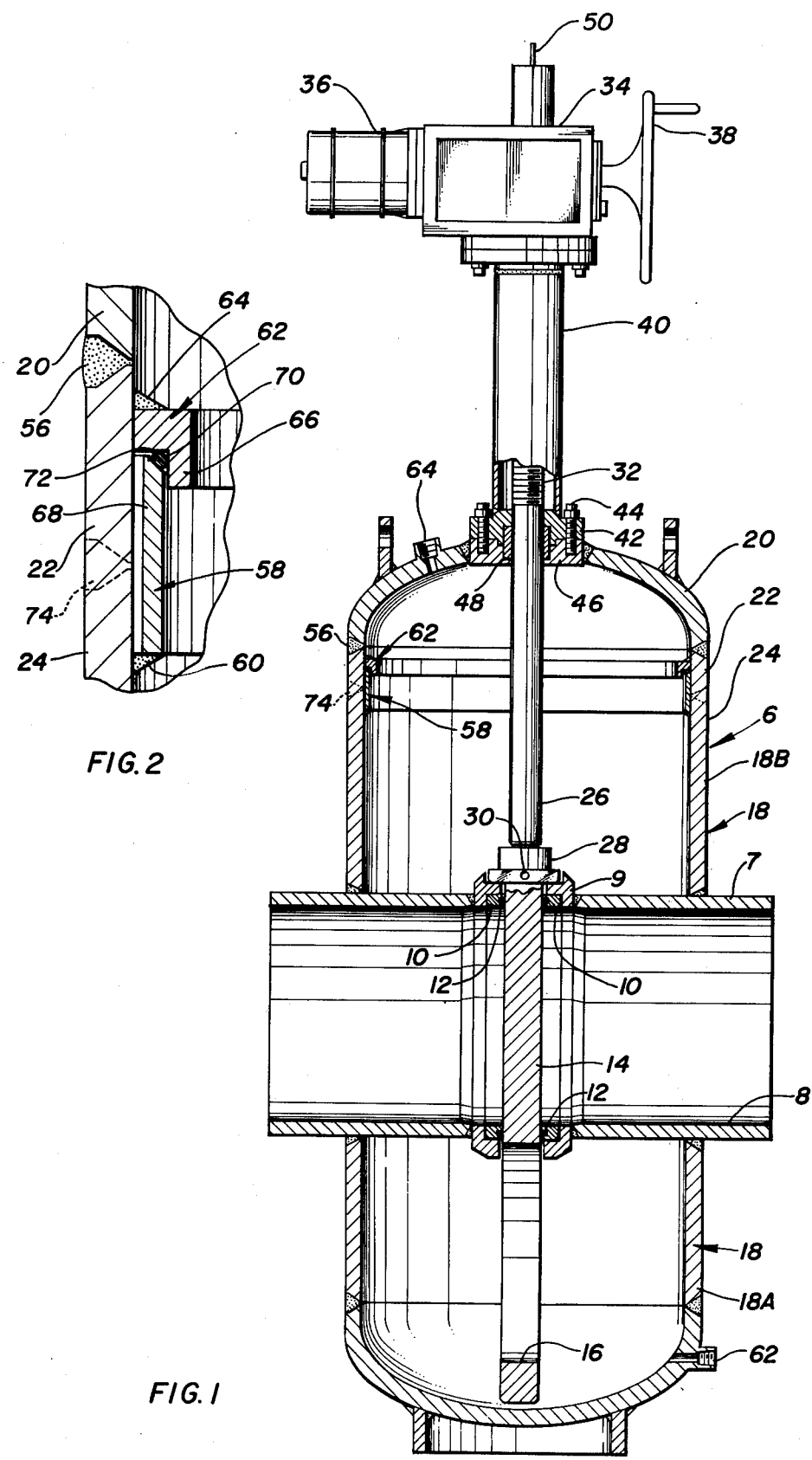
FIG. 2 is an enlarged fragment of FIG. 1 showing the structure forming the present invention secured to the inner surface of the valve bonnet structure.

FIG. 4 is a sectional view similar to FIG. 3 but showing the upper portion of the valve bonnet rewelded to the lower portion thereof in the area adjacent the inner ring secured to the lower portion; and FIG. 5 is an enlarged view of a separate embodiment of the invention in which only an inner ring is secured to the inner surface of the bonnet structure for shielding the cutting and welding operations when the upper bonnet portion is removed and then rewelded to the lower bonnet portion.

Referring now to the embodiment of the invention shown in FIGS. 1-4, a gate valve structure generally indicated 6 is illustrated and includes a conduit 7 forming a flow passage 8. Conduit 7 has enlarged end portions 9 receiving seat rings 10 having face seals 12 thereon. A gate 14 is mounted within a suitable opening in conduit 7 to control the flow of fluid through conduit 7 and seals 12 engage the adjacent surfaces of gate 14. Gate 14 has an opening 16 which may be positioned in alignment with flow passage 8 formed by conduit 7 to permit the flow of fluid therethrough. A valve body 18 is secured about conduit 7 and includes a lower body portion 18A and an upper body portion 18B which form a valve chamber receiving gate 14. Upper body portion 18B includes an upper bonnet portion 20, an intermediate bonnet portion 22, and a lower bonnet portion 24.

A valve stem 26 has a stem connector 28 adjacent its lower end connected to gate 14 by a pin 30. Upon removal of pin 30, stem 26 may be disconnected from gate 14. Stem 26 is threaded adjacent its upper end at 32 and is connected to a gear operator generally indicated at 34 which may be actuated by a motor 36 or selectively by a handwheel 38. A yoke tube 40 has a lower flange 42 secured by studs 44 to a mounting plate 46 on upper bonnet portion 20. A suitable bearing 48 and associated packing is provided to minimize any leakage upon reciprocation of gate 14 and stem 26. Stem 26 is of the rising stem type and an indicator rod 50 indicates the position of gate 14.

As shown particularly in FIG. 2, upper bonnet portion 20 is welded at 56 to intermediate bonnet portion 22. When valve structure 6 is initially manufactured, intermediate bonnet portion 22 and lower bonnet portion 24 are integral and an inner circumferential member comprising a ring or sleeve 58 is welded adjacent its lower end at 60 to lower bonnet portion 24. Sleeve 58 may be spaced, for example, around ¼ inch from the inner circumference of adjacent valve bonnet portion 24. Also, during the initial manufacture of gate valve structure 6, angle-shaped member generally indicated 62 may be welded at 64 adjacent its upper edge portion to intermediate valve bonnet portion 22. In some instances it may be desirable to secure member 62 to bonnet portion 22 after bonnet portion 20 has been removed. A downturned leg 66 of angle-shaped member 62 laps an adjacent upper marginal portion 68 of the adjacent sleeve 58. To provide a fluid-tight connection between sleeve 58 and angle-shaped member 62, an O-ring 70 is provided between upper beveled edge 72 of sleeve 58 and the pocket formed by angle-shaped member 62. In some instances, it might not be desired to provide O-ring 70 during the initial manufacture of the valve structure 10.

In the event that entry into the valve chamber is desired or necessary such as might be required for replacement of the seals or for removal of gate 14, upper bonnet portion 20 and intermediate bonnet portion 22 are removed from lower bonnet portion 24 by a suitable cutting tool, such as might be employed for cutting pipe or the like. The cutting tool is employed to cut along a perimeter adjacent sleeve 58 as shown in broken lines at 74 in FIG. 2 and a free end portion of sleeve 58 extends upwardly from lower bonnet portion 24. The cutting tool may comprise a mechanical cutting tool or in some instances may be a cutting torch. As shown in FIG. 3, upper bonnet portion 20 and intermediate bonnet portion 22 have been removed from lower bonnet portion 24 by the cutting tool. From the position shown in FIG. 3, pin 30 may be removed and stem 26 disconnected from gate 14. In this position, entry to the valve chamber is provided and the valve repair may be performed.

After the valve repairs have been made with valve structure 6 in place within conduit 7, stem 26 along with the structure thereon is reconnected to gate 14 by pin 30 and the structure is lowered into position adjacent lower bonnet portion 24. O-ring 70 is positioned within the pocket formed by angle-shaped member 62 and contacts beveled portion 72 when the previously removed structure carrying angle-shaped member 62 is placed in position on lower bonnet portion 24. Member 62 acts as a guide to position the removed structure accurately. In this position, intermediate bonnet portion 22 is welded to lower bonnet portion 24 adjacent sleeve 58. Any weld splatter or the like resulting from the welding operation is shielded by sleeve 58 from the valve chamber and therefore does not contaminate the valve chamber.

O-ring 70 forms a fluid-tight connection between sleeve 58 and angle-shaped member 62. Thus, the welding operation is shielded from any fumes or other fluids from the interior of the valve chamber which could be of a flammable nature. As shown in FIG. 4, the welding operation has been completed with weld 76 securing intermediate valve bonnet portion 22 to lower valve bonnet portion 24.

It may be desirable or necessary to circulate water within the valve chamber during the welding operation or any operation employing a flame. To accomplish this a water inlet 82 in the lower body portion 18A is provided and a water outlet 84 is provided in upper bonnet portion 20. Any trapped gases in the body chamber will be removed by the circulating water thereby to minimize any safety hazards. The circulation of water is especially desirable when gas is being transported by conduit 7.

In some instances it might be desirable to merely shield the welding operation from the interior of the valve chamber without providing any fluid-tight connection between a lower valve bonnet portion and an intermediate valve bonnet portion. As shown in FIG. 5, an embodiment is shown in which sleeve 58A is provided by itself without any separate member secured to intermediate portion 22A to provide a fluid-tight connection for sleeve 58A. Sleeve 58A would provide a shield to the welding operation for minimizing the deposition of any foreign matter or weld splatter within the valve chamber. Likewise, cuttings or other foreign matter resulting from the cutting operation upon removal of upper bonnet portion 20A and intermediate bonnet portion 22A would be prevented from dropping into the valve chamer.

It is believed that a spacing of sleeve 58 and 58A from the adjacent inner circumference of the valve bonnet portions of at least ⅛ inch, and as high as ½ inch or more, is necessary in order to provide adequate spacing. In some instances a cutting torch could be employed for burning the intermediate bonnet portion from the lower bonnet portion and in this instance, an increased spacing of sleeve 58 or 58A from the inner circumference of the bonnet portion would be desirable in order to minimize any burning of the sleeve during the cutting operation.

While the valve structure has been illustrated in the embodiment of FIGS. 1–4 as a gate valve structure, it is to be understood that the method and means for repair of valves comprising this invention may be employed on a bonnet type structure for other type of valves, such as ball valves or cylindrical plug valves, for example.

What is claimed is:

1. A method of repairing a valve structure having an upper body portion with a bonnet thereon and a sleeve secured to the inner surface of the upper body portion spaced from said inner surface a predetermined distance; said method comprising the following steps:

first cutting the upper valve body portion about a perimeter laterally spaced from the sleeve to permit removal of an upper bonnet portion from a lower bonnet portion with the sleeve shielding the interior of the valve body from the cutting operation and lapping the upper and lower bonnet portions;

then repairing the defective element; and thereafter welding the bonnet portions together independent of the sleeve at a position laterally spaced from the sleeve and with the sleeve shielding the interior of the valve body from the welding operation.

2. A method of repairing a gate valve body structure having an upper body portion with a bonnet thereon and one end portion of a sleeve secured to the inner surface of the upper body portion in spaced relation thereto with the other end portion of the sleeve being free; said method comprising the following steps:

securing to the bonnet an interfitting sealing means for the sleeve adjacent the free end portion of the sleeve;

cutting the upper valve body portion about a perimeter laterally spaced from the sleeve to permit removal of an upper bonnet portion from a lower bonnet portion with the sleeve shielding the interior of the valve body from the cutting operation;

then repairing the defective element; and thereafter welding the bonnet portions together with the interfitting sealing means engaging the sleeve and providing a fluid-tight connection between the bonnet portions during the welding operation thereby shielding the welding operation from the interior of the valve body.

3. The method as set forth in claim 2 and further including the step of circulating a liquid within the interior of the valve body during the weldng operation to minimize any gases therefrom.

* * * * *